Oct. 16, 1945.    K. LUTOMIRSKI    2,386,903
TEMPERATURE CONTROL APPARATUS
Filed July 31, 1941
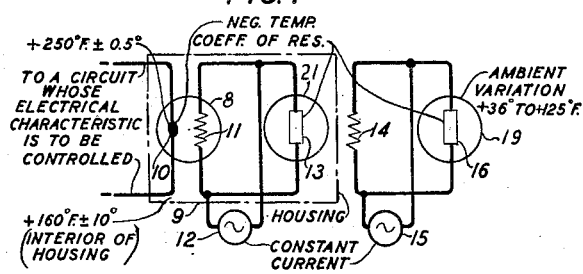
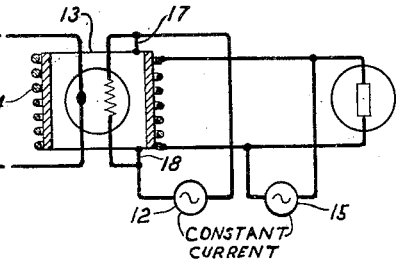
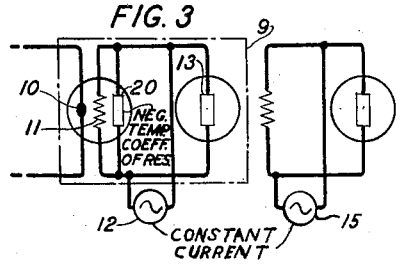
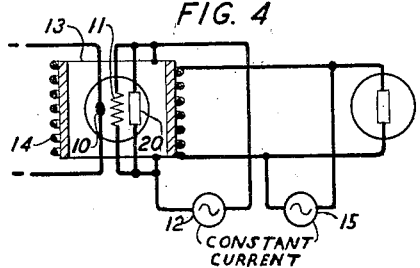
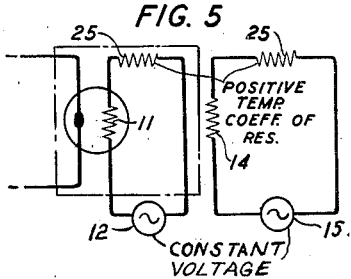
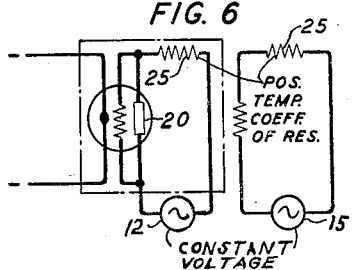
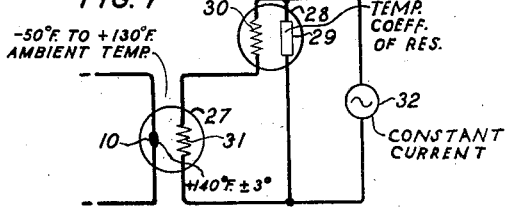
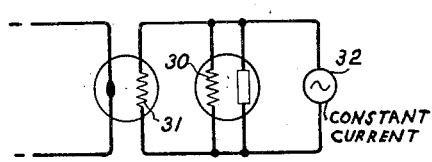
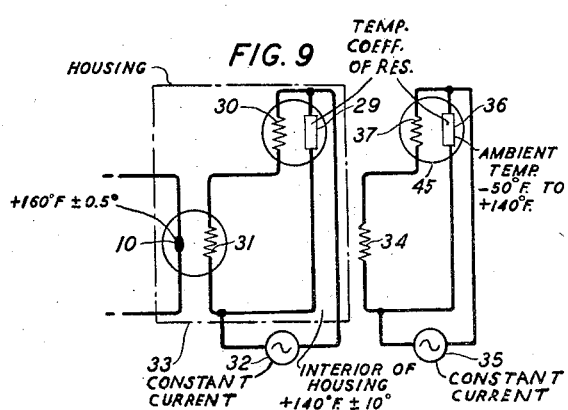
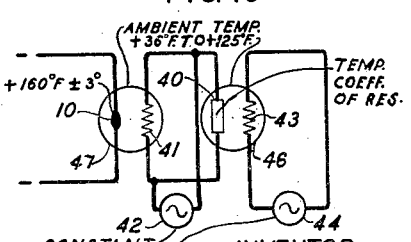
INVENTOR
K. LUTOMIRSKI
BY H. A. Burgess
ATTORNEY Patented Oct. 16, 1945

2,386,903

UNITED STATES PATENT OFFICE 2,386,903

TEMPERATURE CONTROL APPARATUS

Karel Lutomirski, Brooklyn, N. Y., assignor to Bell Telephone Laboratories, Incorporated, New York, N. Y., a corporation of New York Application July 31, 1941, Serial No. 404,869

4 Claims. (Cl. 219—20)

This invention relates to temperature control apparatus, and more particularly to an arrangement to compensate for relatively wide variations in ambient temperature in such apparatus.

Heretofore, temperature control arrangements have been utilized to compensate for the effects of variations in ambient temperature on devices embodied in signaling systems for the purpose of maintaining a certain overall level of transmission. In this connection, one familiar type of temperature control arrangement has been employed to adjust the gain of individual repeaters embodied in successive sections of a relatively long transmission line, each of which sections is subject to a relatively wide temperature variation during a twenty-four hour period. While such temperature compensation is effective to a limited extent, it is not sufficiently sensitive to provide the degree of temperature control required to keep in step with repeaters of improved design tending to promote high efficiency and fidelity in signaling transmission systems.

Accordingly, this invention contemplates an improved temperature control to nullify substantially the effects of relatively wide variations in ambient temperature on a device embodied in an electrical or mechanical system.

The main object of the invention is to compensate for the effect of relatively wide variations of ambient temperature on an electrical or mechanical device.

Another object is to maintain a device at a substantially constant temperature, when heated to a preassigned temperature, for a certain range of variation in ambient temperature.

Still another object is to simplify the selection of individual thermoresponsive elements embodied in temperature control apparatus.

A further object is to compensate for variations in current utilized to energize thermoresponsive elements.

In a specific embodiment, the present invention comprises a device whose temperature is to be maintained substantially independent of relatively wide variations in ambient temperature, a first heating element therefor and a first thermoresponsive element, both of which elements are energized in parallel from a first source of substantially constant electrical current. The device and first heating element contained in one envelope, and the first thermoresponsive element contained in another envelope are enclosed in a suitable housing. A second heating element for the housing and a second thermoresponsive element contained in a further envelope are supplied in parallel from a second source of substantially constant electrical current.

The second thermoresponsive element in response to a variation in ambient temperature extending, for example, between +36° F. and +125° F. serves to control the amount of current supplied to the second heating element such that the first thermoresponsive element, or interior of the housing, is maintained, for example, substantially within a variation of ±10° F. when heated to +160° F. As a consequence, the first thermoresponsive element is caused to control the amount of current supplied to the first heating element associated with the device whose temperature is to be controlled such that the temperature of the latter is maintained, for example, substantially within a variation of ±4° F. when heated to +200° F., and a variation of ±0.5° F. when heated to +250° F.

A feature of the invention is that the first thermoresponsive element may be provided with a tubular configuration within which are positioned the device whose temperature is to be controlled and the first heating element therefor so as to eliminate the need for the housing. Another feature is that the device whose temperature is to be controlled may be maintained substantially independent of variations in the amount of current supplied thereto by the first source of electrical power. A further feature obviates the selection of individual thermoresponsive elements on a basis of exact precision as heretofore required in single stage temperature control apparatus for the reason that in the present invention precise sensitivity may be obtained by means of two or more stages of temperature control. An additional feature is that the first thermoresponsive element may comprise a resistance element having either a positive or negative temperature coefficient of resistance. A further feature provides finer temperature control by indirectly heating the individual thermoresponsive elements to accomplish in effect a feedback action between the individual heating elements and thermoresponsive elements.

The invention will be readily understood from the following description taken together with the accompanying drawing in which:

Fig. 1 is a schematic circuit illustrating a specific embodiment of the invention;

Fig. 2 is a schematic circuit showing a modification of Fig. 1;

Fig. 3 is a schematic circuit showing another embodiment of the invention;

Fig. 4 is a schematic circuit representing a modification of Fig. 3;

Fig. 5 is a schematic circuit illustrating another embodiment of the invention;

Fig. 6 is a schematic circuit which is a modification of both Figs. 3 and 5;

Figs. 7, 8 and 9 are schematic circuits showing modifications of Figs. 3 and 6 in the respect that certain thermoresponsive elements are indirectly heated; and Fig. 10 is a schematic circuit showing another embodiment of the invention.

Referring to Fig. 1, the temperature of electrical apparatus 10 is to be maintained substantially independent of relatively wide variations in ambient temperature. In other words, the temperature of the apparatus 10, when heated to a preassigned amount, is to be maintained substantially constant regardless of a relatively wide variation in ambient temperature.

The apparatus 10 may comprise various material utilized for particular purposes in electrical or mechanical systems. For example, the apparatus 10 may comprise a thermoresponsive element for controlling the gain of a repeater as illustrated in the patent of J. H. Bollman, No. 2,231,558 granted February 11, 1941. In this connection the apparatus 10 is a thermistor, or resistance element, having a high negative temperature coefficient of resistance of which silver sulphide, uranium oxide, and boron are well-known examples, and is enclosed in an envelope 8. The apparatus 10 may also comprise a crystal of a crystal filter, a tuning fork in an oscillation system, or other apparatus whose temperature is to be controlled.

Disposed in the envelope 8 in close proximity of the apparatus 10 is a heating element 11 which is connected to a source 12 of substantially constant current. A thermistor 13 enclosed in an envelope 21 and having a high negative temperature coefficient of resistance is also connected to the current source 12 in parallel with the heating element 11. A suitable housing 9 encloses the respective envelopes 8 and 21 embodying the apparatus 10, heating element 11 and thermistor 13. Positioned in close proximity of the housing 9 is a heating element 14 which is applied to a source 15 of substantially constant current. A thermistor 16 enclosed in an envelope 19 and having a high negative temperature coefficient of resistance is also connected to the current source 15 in parallel with the heating element 14.

In the operation of Fig. 1, variations in the effective resistance of the thermistor 16 in response to variations in ambient temperature extending, for example, over a range between +36° F. and +125° F. serve to control the amount of current supplied to the heating element 14 from the source 15 such that the interior of the housing 9 including the thermistor 13 is substantially maintained, for example, within a variation of ±10° F. when heated to +160° F. Such temperature control of the thermistor 13 causes variations in the effective resistance thereof to control the amount of current supplied to the heating element 11 from the source 12 such that the temperature of apparatus 10 is substantially maintained within a variation of ±4.0° F. when heated to +200° F. and ±0.5° F. when heated to +250° F.

Thus, the heating element 11 and associated thermistor 13, and heating element 14 and associated thermistor 16 are proportioned such that the apparatus 10, when heated to a preassigned temperature, may be maintained substantially constant at that temperature over a relatively wide range of variation in ambient temperature. This is accomplished without imposing relatively severe temperature requirements on individual thermistors. Such temperature control of the apparatus 10 tends to obviate the effect of relatively wide variations in ambient temperature thereon so that the apparatus 10 will perform more accurately its required function in a particular electrical or mechanical system.

Fig. 2 is the same as Fig. 1 except the thermistor 13 of the latter is provided with a tubular configuration within which are disposed the apparatus 10 and heating element 11 therefor, and about the periphery of which is applied the heating element 14. Links 17 and 18 serve to connect the tubular thermistor 13 to the source 12 in the manner mentioned regarding Fig. 1. The temperature control specified hereinbefore for Fig. 1 also obtains for Fig. 2. Thus, the tubular thermistor 13 of Fig. 2 may effectively replace the housing 9 of Fig. 1.

Fig. 3 is identical with Fig. 1 except a thermistor 20 is applied in shunt of the heating element 11 and is also heated thereby. Hence, when the amount of current supplied by the source 12 increases, the resistance of the thermistor 20 decreases, thereby effectively decreasing the amount of current flowing in the heating element 11; and when the amount of current supplied by the source 12 decreases, the resistance of the thermistor 20 increases thereby effectively increasing the amount of current flowing in the heating element 11. This is, in effect, a feedback action between the heating element 11 and thermistor 20. Thus, an amount of current is supplied to the heating element 11 such that the temperature of the apparatus 10 is rendered substantially independent of variations in the amount of current supplied by the source 12. This accomplishes a more accurate temperature control of the apparatus 10 as will be hereinafter discussed in connection with Figs. 7, 8 and 9.

Fig. 4 is a combination of Figs. 1, 2 and 3 in that the thermistor 13 is provided with a tubular configuration within which are positioned the apparatus 10, heating element 11 therefor, and thermistor 20, and about the periphery of which is applied the heating element 14. The temperature control pointed out above in connection with Figs. 1, 2 and 3 is also achieved in Fig. 4. Thus, the tubular thermistor 13 of Fig. 4 may replace the housing 9 of Figs. 1 and 3.

Fig. 5 is the same as Fig. 1 except a pair of resistors 25, 25 having positive temperature coefficient of resistance is substituted for the thermistors 13 and 16, and are individually connected in series with the heating elements 11 and 14. Obviously, the same substitution could be readily made in Fig. 3.

Fig. 6 is a combination of Figs. 3 and 5 and includes both the thermoresponsive elements 20 and 25.

Fig. 7 is a modification of Figs. 3 and 6 in the use of the thermistor 20 of both latter figures. Referring to Fig. 7, the temperature, or effective resistance, of thermistor 29 mounted in envelope 28 and having a high temperature coefficient of resistance is controlled by current flowing therethrough, a certain range of variation of ambient temperature, and heat due to heating element 30 which is also contained in the envelope 28 and which is connected in series with the heating element 31 utilized to heat the apparatus 10 mounted in an envelope 27 with the latter and whose temperature is to be controlled. This arrangement enables a control of the amount of current supplied by a source 32 of substantially constant current to maintain, for example, the temperature of the apparatus 10 at approximately +140° F. ±3° for range of variation of ambient temperature, for example, extending approximately from −50° F. to +140° F.

The thermistor 29, due to its change of resistance, and the heating element 30 constitute in effect a feedback action relative to the current supplied by the source 32. Thus, the arrangement of Fig. 7 provides a sensitive control of the temperature of the apparatus 10 with respect to both variations in the amount of current supplied by the source 32 and variations in ambient temperature.

Fig. 8 is the same as Fig. 7 except the heating element 30 is connected in parallel with the heating element 31.

Fig. 9 shows two stages of the arrangement of Fig. 7 to obtain closer temperature regulation of the apparatus 10. Referring to Fig. 9 a housing 33 encloses the apparatus 10, heating element 31 therefor, thermistor 29 and heating element 30 therefor. A heating element 34 heating the interior of the housing 33 is energized from a source 35 of substantially constant current. A thermistor 36 having a high temperature coefficient of resistance is applied in shunt of both the heating elements 34 and 37 in series. A heating element 37 for the thermistor 36 is mounted in envelope 45 together with the latter. According to the arrangement of Fig. 9, the temperature of the apparatus 10 is maintained, for example, approximately at +160° F. ±0.5°, the interior of the housing 33, for example, approximately at +140° F. ±10°, and the thermistor 36 is subject, for example, to an ambient temperature variation of −50° F. to +140° F.

It is understood that Fig. 9 may include at least two stages of the arrangement shown in Fig. 8, or a combination of both Figs. 7 and 8; and further that a more sensitive control of the temperature of the apparatus 10 may be obtained by utilizing more than two stages of the various figures discussed above.

Fig. 10 shows an arrangement for maintaining the apparatus 10 at a temperature which is relatively close to the maximum ambient temperature. Heretofore, it has been found difficult to maintain the apparatus 10 at an approximate temperature of +160° F. ±3°, for example, when the temperature of thermistor 40 having a high temperature coefficient of resistance is subject to a variation in ambient temperature extending, for example, from +36° F. to +125° F. Although a plurality of stages of temperature control as hereinbefore discussed may suffice to provide the specified temperature control, it may happen that such stages may be objectionable in certain circuit designs. Referring to Fig. 10, the specified temperature control may be expeditiously controlled by applying to thermistor 40 and heating element 41 mounted in envelope 47 with the apparatus 10 a source 42 of substantially constant current. Associated with the thermistor 40 in envelope 46 is a heating element 43 energized from a source 44 of substantially constant current. The effective resistance of the thermistor 40 is controlled by (a) ambient temperature, (b) heating element 43, and (c) current from the source 42. This controls the amount of current supplied to the heating element 41 from the source 42 such that the temperature of the apparatus 10 is maintained at the above-mentioned temperature.

What is claimed is:

1. A system for continuously regulating the temperature of apparatus, including a plurality of enclosures of different sizes arranged such that the smaller enclosure is positioned within the next larger enclosure, said apparatus being positioned within the innermost enclosure, a heating element positioned within the innermost enclosure in heat-transfer relation to said apparatus, a source of constant current for energizing said heating element, and means including a resistor having a temperature coefficient of resistance connected to both said source and said heating element and continuously responsive to variations of the temperature external to the innermost enclosure to change its effective resistance for continuously controlling the effective amount of current energizing said heating element such that the temperature within the innermost enclosure, and thereby the temperature of said apparatus, is maintained substantially constant.

2. In combination, in an arrangement for continuously regulating temperature, including two enclosures one of which is positioned within the other, and apparatus whose temperature is to be regulated and which is positioned in said one enclosure, means for continuously maintaining said apparatus substantially at a preselected temperature, comprising one heating means positioned in said one enclosure in heat-transfer relation to said apparatus, other heating means positioned exteriorly of said other enclosure in heat-transfer relation thereto, current supply means for energizing each of said heating means, and thermosensitive elements having individual temperature coefficients of resistance and connected in circuit with said respective heating means and said current supply means for continuously controlling the effective amount of current supplied to said respective heating means such that one thermosensitive element positioned exteriorly of said other enclosure varies its effective resistance in response to a certain range of ambient temperature for substantially maintaining the temperature in said other enclosure within a preselected range of variation with reference to a predetermined temperature and such that the other thermosensitive element positioned interiorly of said other enclosure varies its effective resistance in response to the preselected range of temperature variation in said other enclosure for maintaining the temperature of said apparatus substantially at said preselected temperature.

3. The combination according to claim 2 which includes a further thermosensitive element having a temperature coefficient of resistance and positioned in said one enclosure in heat-transfer relation to said one heating means and connected in parallel therewith to change its effective resistance in response to variations in the amount of current supplied by said current supply means for further controlling the effective amount of current supplied to said one heating means thereby to compensate said preselected temperature of said apparatus for the tendency of said current supply means to vary the amount of current supplied thereby.

4. In a system for maintaining the temperature of a device substantially independent of atmosphere temperature fluctuations including enclosures one inside another with said device inside the innermost enclosure, one heating element for the outer enclosure and another heating element for the innermost enclosure, a source of steady heating current supplying each of said heating elements, and resistors having a high temperature coefficient of resistance, each said resistor exposed to the temperature fluctuations in its immediate surrounding space, said resistors being connected in circuit with said heating current supply source and respectively controlling the amount of heating current supplied to the respective heating elements for the respective enclosures as a function of the temperature variation of the respective resistors, one of said resistors being outside the outer enclosure and another being inside the outer enclosure, said heating element for said inner most enclosure being inside thereof with said device and connected to said last resistor, and said heating element for said outer enclosure being outside thereof and connected to said one resistor.

KAREL LUTOMIRSKI.